No. 699,561. Patented May 6, 1902.
M. W. PALMER.
BEET PULLER.
(Application filed Dec. 26, 1901.)
(No Model.)

WITNESSES:
Geo. P. Kingsbury
Harrison B. Brown

INVENTOR
Merritt Wesley Palmer.
BY Munn & Co.
ATTORNEYS

UNITED STATES PATENT OFFICE.

MERRITT WESLEY PALMER, OF HAMILTON, MICHIGAN.

BEET-PULLER.

SPECIFICATION forming part of Letters Patent No. 699,561, dated May 6, 1902.

Application filed December 26, 1901. Serial No. 87,285. (No model.)

*To all whom it may concern:*

Be it known that I, MERRITT WESLEY PALMER, of Hamilton, in the county of Allegan and State of Michigan, have invented certain new and useful Improvements in Beet-Pullers, of which the following is a specification.

I am aware of many devices, such as special plows and complicated and heavy machines, but I know of no device such as I have devised and constructed for lifting the beets free of the ground without materially disturbing or breaking up the soil.

The device which I have invented somewhat resembles a mole-plow, inasmuch as the beet-lifting means runs under the ground and is adapted to be drawn by horse-power.

In order to enable others to make and use my invention, I will now proceed to describe its construction and use, reference being had to the accompanying drawings, which form a part of this specification, and in which—

Figure 1:
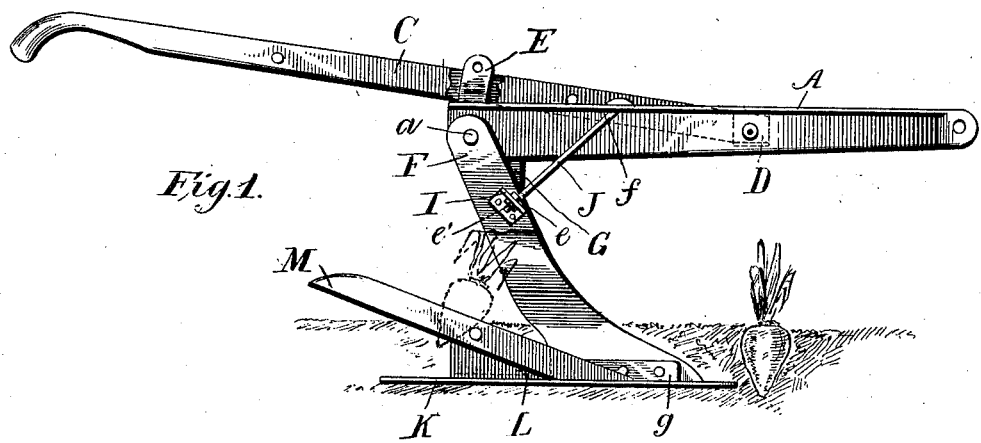
Figure 2:
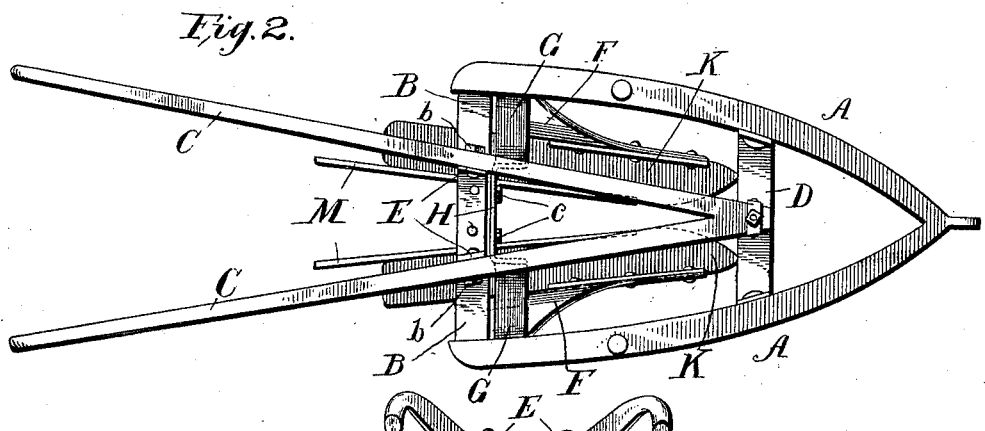
Figure 3:
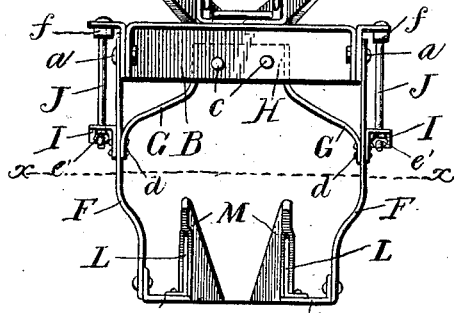
Figure 4:
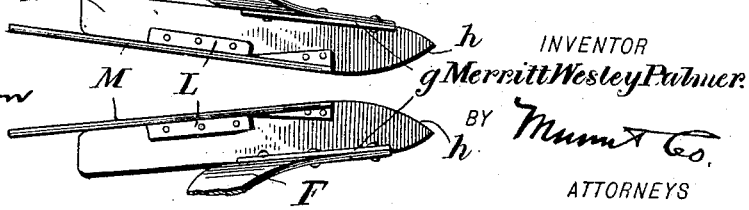

Figure 1 is a side elevation, part broken away, showing the device in use lifting a beet top and all from the ground. Fig. 2 is a plan view. Fig. 3 is a rear elevation. Fig. 4 is a detail plan view taken on line $x$ $x$ of Fig. 3, showing the spaced position of the two runners.

In the drawings, A denotes a V-shaped beam, the apex of which being the point of draft. The beam is preferably formed of two angle-irons with the rear ends connected by a like shaped brace-iron B, having its ends bent in line with the beam members and secured by bolts $a$. The handles C extend from and are secured to a cross-bar D, bolted to the beam members, and project rearwardly, as shown. Each handle has connection with a curved ear E, having two or more perforations, one above the other, permitting vertical adjustment of the handles by changing the bolts $b$ from one to the next perforation.

To the rear end of each member of the V-shaped beam is secured by bolts $a$ the upper end of a standard F. The standards F are braced apart by arms G, formed by downwardly-divergent ends of a bar H, bolted to the brace-irons B at $c$ $c$, and the lower ends of the arms G are secured to the standards by bolts $d$, about half-way thereof, as shown. The bolts $d$, in addition to securing the arms G, form fastening means for ears I, perforated for the reception of a brace-rod J, headed at its upper end and passing down through the horizontal flange of the beam member. The lower end of the brace-rod J is screw-threaded from a point above the ears I to its lower end, and upon the threaded portion are arranged two nuts $e$ $e'$, one, $e$, above the said ear I and the other, $e'$, below it. The devices last described are intended for adjusting the beam with relation to the standards to cause the runners K, hereinafter described, to travel shallow or deeper in the ground, as may be desired. It will be understood that the beam members have pivotal movement on the bolts $a$. In adjusting the beam one of the nuts $e$ or $e'$ on the threaded portion of the brace-rod is turned, backing it away from the ear I, and the other nut screwed up to the said ear I, and so on, until the desired adjustment is had, when both nuts should be tightened against the ear. It is obvious that the brace-rods J must have means, such as a lug $f$ or other device arranged thereon, to bear against the under side of the horizontal flange of the beam member. The upper end of the rod J may be modified in its fastening means, if desired, by nuts threaded thereon, with one above and one below the beam-flange.

The standards F about midway curve inwardly and downwardly to a vertically-disposed lower end and the forward edge of the standards is sharpened to cut the earth. The vertically-disposed lower end of the standards is widened and continued down to a point, forming an elongated landside, as shown, and supports a runner K. The outer edge of each runner near its pointed or forward end at $g$ is bent upwardly and riveted to the lower end of the standards F. The inner forward edge of the runners is curved inwardly at $h$ to a point about midway of the standards, forming a V-shaped mouth or passage-way. From this point the runners diverge or incline outwardly, as shown in Fig. 4 of the drawings. To the inner edge of the runners is riveted a vertical projection L, substantially triangular in shape, with a horizontally-disposed flange resting upon the runners (best shown in Fig. 3 of the drawings) to receive the securing-rivets, and to the upper edge of the said projection L of each runner is riveted a lifter-arm M, extending at an angle from the inner edge of the runner upwardly and rearwardly, as shown.

For operation when the standards and beam have been relatively adjusted as desired and secured by the brace-rod J and nuts thereon and the handles C also adjusted by suitably arranging the bolts b in the perforations of the ears E the device, which as a whole I term a "beet-puller," is ready for use. In pulling the beets the runners enter the ground one on each side of a row, and as the puller is drawn forward the runners pass on each side of a beet until it comes in contact with the lifter-arms. Upon a continued forward movement of the device the beets will slide upon the lifter-arms and be forced upwardly out of the ground, where they can be picked up and their tops removed by hand-labor.

With a device such as I have devised, having all forward edges sharpened working underground save the lifter-arms, the puller may with slight draft be drawn forward and the beets be lifted free of the ground without materially disturbing it.

Having thus fully described my invention, what I claim as new, and desire to secure by Letters Patent, is—

1. The combination in a beet-puller, of a V-shaped beam, handle-bars having vertical adjustment as set forth, braced standards bolted to the rear end of the beam and spaced as shown, a brace-iron connecting each standard with its respective member of the beam, the brace-irons passing through the beam member and an ear on the standard, the upper end of the brace-iron being headed as shown, and its lower end threaded and provided with nuts one on each side of the said ear, elongated and horizontally-disposed runners rigid with the standards and inclined lifter-arms, substantially as described, rigid with the runners, as set forth.

2. The combination in a beet-puller substantially as described employing a beam, handle-bars and standards as shown, of means permitting independent adjustment of the handle-bars and standards, and beet-raising means consisting of elongated runners rigid with the standards, and a substantially triangular vertically-disposed plate rigid with the runners supporting inclined lifter-arms as set forth.

3. The combination in a beet-puller substantially as described employing a beam, handle-bars and standards as specified, of means permitting independent adjustment of the handle-bars and standards, inclined braces connecting the latter and the beam and arranged between the standards as shown, and beet-raising means consisting of elongated runners rigid with the standards supporting inclined lifter-arms as set forth.

MERRITT WESLEY PALMER.

Witnesses:
ELMER WELLS,
M. E. HOADLEY.